Patented Oct. 23, 1951

2,572,557

UNITED STATES PATENT OFFICE 2,572,557

MINERAL OIL COMPOSITIONS CONTAINING THE REACTION PRODUCT OF POLYSTYRENE AND AN ALKYL ESTER OF AN UNSATURATED ACID

John Mann Butler, Dayton, Ohio, assignor to Monsanto Chemical Company, St. Louis, Mo., a corporation of Delaware No Drawing. Application January 29, 1948, Serial No. 5,201

15 Claims. (Cl. 252—57)

This invention relates to a modified oil soluble polystyrene made by substituting high molecular weight units on polystyrene. More particularly the invention relates to new and improved additives for increasing the viscosity index of petroleum products and especially lubricating oils.

It is known that the viscosity index of petroleum products can be influenced by adding alkylated polystyrene and that such modified styrenes are oil soluble as distinguished from the unmodified polystyrene. The fundamental purpose of this invention is to provide a new class of compounds which are superior to the conventional alkylated polystyrenes. A further purpose of this invention is to provide a new means of increasing the viscosity index of petroleum products.

In accordance with this invention it has been found that certain high molecular weight unsaturated esters will react with polystyrene to form substituted polystyrenes which are soluble in petroleum products, and materially improve the viscosity characteristics of those products. The unsaturated esters which are capable of reacting with polystyrene are the alkyl esters of monocarboxylic fatty acids having from 10 to 20 carbon atoms and an olefinic bond in a position other than the alpha-beta position. The esters of alpha-beta unsaturated acids, such as methyl acrylate, the esters of acids having a plurality of double bonds, such as methyl linoleate, and the esters having a double bond in the alcohol portion of the ester, such as allyl stearate are not useful in producing modified polystyrene exhibiting the same beneficial effect upon oil stocks. The most readily available esters, and by far the most important esters are the alkyl esters of oleic acid, wherein the alkyl groups have from one to 20 carbon atoms.

The new substituted polystyrenes have the structural formula:

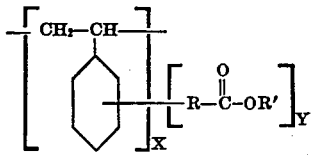

wherein R is a branched chain divalent hydrocarbon radical of 9 to 19 carbon atoms, R' is an alkyl radical having from one to twenty carbon atoms, X is a whole number indicative of the extent of polymerization of the polystyrene, and Y is a whole number indicating the number of substituents on the polystyrene molecule.

The new modified polystyrenes are prepared by reacting polystyrene with the alkyl ester of a mono-olefinic carboxylic acid in the presence of a Friedel and Crafts catalyst, such as zinc chloride, aluminum chloride, boron trifluoride and hydrofluoric acid. Generally slightly more than equal molar quantities of the catalyst, based on the unsaturated ester, are used. The reaction is preferably conducted in the presence of a suitable solvent inert with respect to the reagents and catalyst used, for example nitrobenzene, o-dichlorobenzene, chlorobenzene and ethylene dichloride. Although the reaction may proceed at room temperature with the evolution of heat, generally it is desirable to heat the reaction mass to 30° C. to 80° C. to complete the reaction.

Some of the new compositions may also be prepared by ester interchange from the polystyrene derivatives of the corresponding esters of lower molecular weight alcohols. For example, polystyrene modified by reaction with methyl oleate may be treated with a higher molecular weight alcohol, such as amyl, octyl or lauryl alcohols, whereby the radicals of the said higher alcohols replace the methyl radicals. These ester interchange reactions are conducted by heating, preferably in the presence of an esterification catalyst, and the lower molecular weight alcohol removed from the reaction mass by distillation.

The polystyrene used in the preparation of the new viscosity index modifiers is preferably a higher molecular weight polystyrene, for example one having an average molecular weight between 20,000 and 100,000. Lower molecular weight polystyrene may be used but the beneficial results achieved are not as pronounced.

The new materials are used to improve the viscosity index of petroleum products in the manner well known to the art. Although considerable variation is possible with respect to the amount of the modified polystyrene which is added to petroleum products, in general from 0.2 percent to 6 percent by weight will produce substantial improvement in the viscosity index of lubricating oils.

Further details of the preparation of the new product and their use in increasing the viscosity of petroleum products are set forth with respect to the following specific examples.

Example 1

A glass reaction flask was charged with 104 grams of a ten percent solution in o-dichlorobenzene of 70,000 average molecular weight polystyrene, 10 grams of nitrobenzene and 50 grams of methyl oleate. The reaction mixture was then mixed with 27 grams of aluminum chloride which was gradually added over a period of 45 minutes. During the addition the temperature gradually increased to 50° C. After the addition of aluminum chloride was completed the reaction mass was stirred for one hour at 60° C. with periodic additions of o-dichlorobenzene to prevent the mass from becoming too viscous. A further charge of 17.5 grams of methyl oleate and 13.3 grams of aluminum chloride was added over a two hour period while maintaining the stirred solution at a temperature of 60° C. The stirring was then continued at 60° C. for an additional five hours.

The reaction mixture was washed with dilute hydrochloric acid and then with water, and the resulting solution was poured into ethanol while agitated vigorously in a "Waring Blendor," thereby precipitating the substituted polystyrene. The resulting material was a clear, tough, solid polymer which was soluble in Mid-Continent solvent refined oil at a temperature above 85° C. and was also soluble in a light distillate oil at 20° C.

*Example 2*

A reaction flask was charged with 104 grams of a ten percent solution of polystyrene (70,000 average molecular weight) in o-dichlorobenzene, 10 grams of nitrobenzene and 56 grams of butyl oleate. The contents of the flask was then saturated with dry hydrochloric acid gas, and while stirring 27 grams of aluminum chloride were added over a period of 90 minutes. Throughout the reaction the temperature gradually rose to 50° C., at which temperature the stirring was continued for two hours. The reaction mass was washed and the polymer precipitated in the same manner as described in Example 1. The resulting polymer was soluble in Mid-Continent solvent refined oil and the resulting solutions had kinematic viscosities (expressed in centistokes) and visocisity indices as set forth in the following table.

| Per cent Polymer | Kinematic Viscosity, in Centistokes | | Viscosity Index |
|---|---|---|---|
| | 100° F. | 210° F. | |
| 0.0 | 29.62 | 5.10 | 111.8 |
| 1.0 | 32.40 | 5.83 | 131.9 |
| 2.0 | 37.54 | 6.92 | 143.1 |
| 3.0 | 43.16 | 8.07 | 146.5 |

*Example 3*

The procedure of the preceding example was duplicated except that a molar portion of 2-ethyl-hexyl oleate was used in place of the butyl oleate. The following table represents the viscosities and viscosity indices observed when the resulting polymer was dissolved in Mid-Continent solvent refined lubricating oil.

| Per cent Polymer | K. V. in Centistokes | | Viscosity Index |
|---|---|---|---|
| | 100° F. | 210° F. | |
| 0.0 | 29.62 | 5.10 | 111.8 |
| 1.0 | 38.01 | 6.93 | 141.5 |
| 2.0 | 49.75 | 9.25 | 147.7 |
| 3.0 | 65.76 | 12.40 | 149.6 |

*Example 4*

The procedure of Example 2 was repeated except that the molar proportional quantity of oleic acid esters of mixed alcohols derived from coconut oils was used in place of the butyl oleate. The following table demonstrates the effect of dissolving the resulting polymer in Mid-Continent solvent refined lubricating oil.

| Per cent Polymer | K. V. in Centistokes | | Viscosity Index |
|---|---|---|---|
| | 100° F. | 210° F. | |
| 0.0 | 29.62 | 5.10 | 111.8 |
| 0.5 | 35.12 | 6.28 | 128.5 |
| 1.0 | 43.63 | 7.21 | 143.0 |
| 2.0 | 64.36 | 11.83 | 148.0 |
| 3.0 | 89.94 | 16.53 | 147.3 |

*Example 5*

A 200 gram quantity of a ten percent benzene solution of the polymer obtained by Example 1 was charged to a flask provided with a reflux condenser and 0.2 gram of sodium dissolved in 50 grams of 2-ethyl-hexanol was added thereto. Gelation occurred in about five minutes. The reaction mixture was heated at reflux temperature for ten hours and allowed to stand at room temperature for eighteen hours. Thereafter sufficient benzene sulfonic acid was added to neutralize the sodium alcoholate causing the dissolution of the gel. The solution was then washed with water and precipitated by pouring into ethanol. The resulting polymer was dissolved in various proportions in Mid-Continent solvent refined oil and the following table demonstrates the viscosities and viscosity indices observed.

| Per cent Polymer | K. V. in Centistokes | | Viscosity Index |
|---|---|---|---|
| | 100° F. | 210° F. | |
| 0.0 | 29.62 | 5.10 | 111.8 |
| 1.0 | 37.23 | 6.71 | 138.8 |
| 2.0 | 47.00 | 8.72 | 147.3 |
| 3.0 | 57.22 | 10.97 | 150.6 |

*Example 6*

Using a procedure analogous to that prescribed in Example 5, polystyrene modified by the substitution of methyl oleate was converted by ester-interchange in the presence of a mixture of alcohols derived from coconut oil to form a mixture of substituted polystyrenes comparable to that prepared in accordance with Example 4. The resulting polymer was dissolved in a solvent refined Mid-Continent oil and the following table demonstrates the kinematic viscosities and viscosity indices observed.

| Per cent Polymer | K. V. in Centistokes | | Viscosity Index |
|---|---|---|---|
| | 100° F. | 210° F. | |
| 0.0 | 29.62 | 5.10 | 111.8 |
| 1.0 | 35.01 | 6.91 | 151.0 |
| 3.0 | 48.84 | 11.84 | 163.1 |

In order to compare the products produced in accordance with the preceding examples with commercially available viscosity index improvers, polystyrene alkylated with a long chain hydrocarbon olefin and polyisobutylene were dissolved in the same Mid-Continent oil stock. The following tables demonstrate the kinematic viscosities and viscosity indices observed at various concentrations.

Polystyrene alkylated with a long chain hydrocarbon olefine

| Per cent by Weight | K. V. in Centistokes | | Viscosity Index |
|---|---|---|---|
| | 100° F. | 210° F. | |
| 0.0 | 29.62 | 5.10 | 111.8 |
| 0.5 | 36.52 | 6.25 | 128.2 |
| 1.0 | 44.24 | 7.60 | 136.7 |
| 2.0 | 64.20 | 10.99 | 142.8 |
| 3.0 | 90.23 | 14.97 | 143.0 |

Polyisobutylene

| Per cent by Weight | K. V. in Centistokes | | Viscosity Index |
|---|---|---|---|
| | 100° F. | 210° F. | |
| 0.0 | 29.62 | 5.10 | 111.8 |
| 1.0 | 32.90 | 5.65 | 121.0 |
| 3.0 | 45.03 | 7.44 | 131.2 |
| 6.0 | 70.09 | 10.86 | 135.0 |

It should be observed that the viscosity indices of the commercially available materials reach a lower maximum value with increasing concentrations than do the products prepared in accordance with this invention. This means that the new products in many cases can be used to give viscosity indices that are unattainable with any quantity of the commercial additives shown.

The relative quality of viscosity index improvers can be estimated by making blends having identical viscosities at a given temperature. In such cases the viscosity index is a good measure of the effectiveness of the viscosity index improver. The following table compares the viscosity index values for the polymer prepared in accordance with the preceding examples and commercially available modifying compounds when the improvers are each blended with the same oil stock to give a viscosity of 7 centistokes at 210° F.

```
                            Viscosity index
Example 2 ------------------------- 143.3
Example 3 ------------------------- 141.8
Example 4 ------------------------- 140.3
Example 5 ------------------------- 140.3
Example 6 ------------------------- 151.5
Alkylated polystyrene ------------- 137.8
Polybutylene ---------------------- 130.0
```

Although the invention has been described with respect to specific modifications, it is not intended that the details thereof shall be construed as limitations upon the scope of the invention except to the extent incorporated in the following claims.

I claim:

1. A modified polystyrene comprising polystyrene substituted by reaction with an ester having the structural formula:

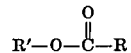

wherein R' is an alkyl radical having from one to 20 carbon atoms and R is a mono olefinic hydrocarbon radical of 9 to 19 carbon atoms having only single bonds attached to the carbon atoms adjacent to the carbonyl radical, said substitution being effected on the benzene nucleus of the polystyrene through the olefinic group of the said ester.

2. A modified polystyrene comprising polystyrene substituted by reaction with an alkyl ester of oleic acid wherein said alkyl radical contains from 1 to 20 carbon atoms and the said substitution being effected on the benzene nucleus of the polystyrene through the olefinic group of the said ester.

3. A modified polystyrene comprising polystyrene substituted by reaction with lauryl oleate, said substitution being effected on the benzene nucleus of the polystyrene through the olefinic group of the said ester.

4. A modified polystyrene comprising polystyrene substituted by reaction with butyl oleate, said substitution being effected on the benzene nucleus of the polystyrene through the olefinic group of the said ester.

5. A modified polystyrene comprising polystyrene substituted by reaction with 2-ethyl-hexyl oleate, said substitution being effected on the benzene nucleus of the polystyrene through the olefinic group of the said ester.

6. A composition of matter which comprises a liquid petroleum fraction and from 0.2 to 6 per cent by weight, based on the petroleum fraction, of a polystyrene substituted by reaction with an ester having the structural formula:

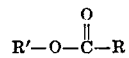

wherein R' is an alkyl radical having from one to 20 carbon atoms and R is a mono olefinic hydrocarbon radical of 9 to 10 carbon atoms having only single bonds attached to the carbon atoms adjacent the carbonyl radical, said substitution being effected on the benzene nucleus of the polystyrene through the olefinic group of the said ester.

7. A composition of matter which comprises a liquid petroleum fraction and from 0.2 to 6 per cent by weight, based on the petroleum fraction, of polystyrene substituted by reaction with an alkyl ester of oleic acid wherein said alkyl radical contains 1 to 20 carbon atoms and the said substitution being effected on the benzene nucleus of the polystyrene through the olefinic group of the said ester.

8. A composition of matter which comprises liquid petroleum products and from 0.2 to 6 per cent by weight, based on the petroleum fraction, of a polystyrene substituted by reaction with lauryl oleate, said substitution being effected on the benzene nucleus of the polystyrene through the olefinic group of the said ester.

9. A composition of matter which comprises liquid petroleum products and from 0.2 to 6 per cent by weight, based on the petroleum fraction, of a polystyrene substituted by reaction with butyl oleate, said substitution being effected on the benzene nucleus of the polystyrene through the olefinic group of the said ester.

10. A composition of matter which comprises liquid petroleum products and from 0.2 to 6 per cent by weight, based on the petroleum fraction, of a polystyrene substituted by reaction with 2-ethyl-hexyl oleate, said substitution being effected on the benzene nucleus of the polystyrene through the olefinic group of the said ester.

11. A method of preparing a modified polystyrene which comprises mixing polystyrene and an ester having the structural formula:

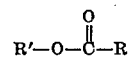

wherein R' is an alkyl radical having from one to 20 carbon atoms and R is a mono olefinic hydrocarbon radical of 9 to 19 carbon atoms having only single bonds attached to the carbon atoms adjacent to the carbonyl radical, in the presence of a Friedel-Crafts catalyst, and separating the resulting product.

12. A method of preparing a modified polystyrene which comprises mixing polystyrene and an alkyl ester of oleic acid, wherein said alkyl radical contains from 1 to 20 carbon atoms in the presence of a Friedel-Crafts catalyst, and separating the resulting product.

13. A method of preparing a modified polystyrene which comprises mixing polystyrene and lauryl oleate in the presence of a Friedel-Crafts catalyst, and separating the resulting product.

14. A method of preparing a modified polystyrene which comprises mixing polystyrene and butyl oleate in the presence of a Friedel-Crafts catalyst, and separating the resulting product.

15. A method of preparing a modified polystyrene which comprises mixing polystyrene and 2-ethylhexyl oleate in the presence of a Friedel-Crafts catalyst, and separating the resulting product.

JOHN MANN BUTLER.

REFERENCES CITED

The following references are of record in the file of this patent:

UNITED STATES PATENTS

| Number | Name | Date |
|---|---|---|
| 1,683,402 | Ostromislensky | Sept. 4, 1920 |
| 2,197,709 | Ralston | Apr. 16, 1940 |
| 2,366,517 | Gleason | Jan. 2, 1945 |

OTHER REFERENCES

Simons Ind. Eng. Chem. 32 178,9 (1940).